APPARATUS AND METHOD FOR CONTROLLING REMOTELY-OPERATED DICTATION EQUIPMENT

Filed May 27, 1959 2 Sheets-Sheet 1

INVENTORS
LLOYD R. JONES
ROGER C. CURTIS
MARION P. SHORB
BY Curtis, Morris & Safford
ATTORNEYS INVENTORS
LLOYD R. JONES
ROGER C. CURTIS
MARION P. SHORB
BY Curtis, Morris & Safford
ATTORNEYS United States Patent Office 3,171,902
Patented Mar. 2, 1965

3,171,902
APPARATUS AND METHOD FOR CONTROLLING REMOTELY-OPERATED DICTATION EQUIPMENT

Lloyd R. Jones, Monroe, Roger C. Curtis, New Haven, and Marion P. Shorb, Fairfield, Conn., assignors to Dictaphone Corporation, Bridgeport, Conn., a corporation of New York Filed May 27, 1959, Ser. No. 816,112
4 Claims. (Cl. 179—100.1)

Figure 1:
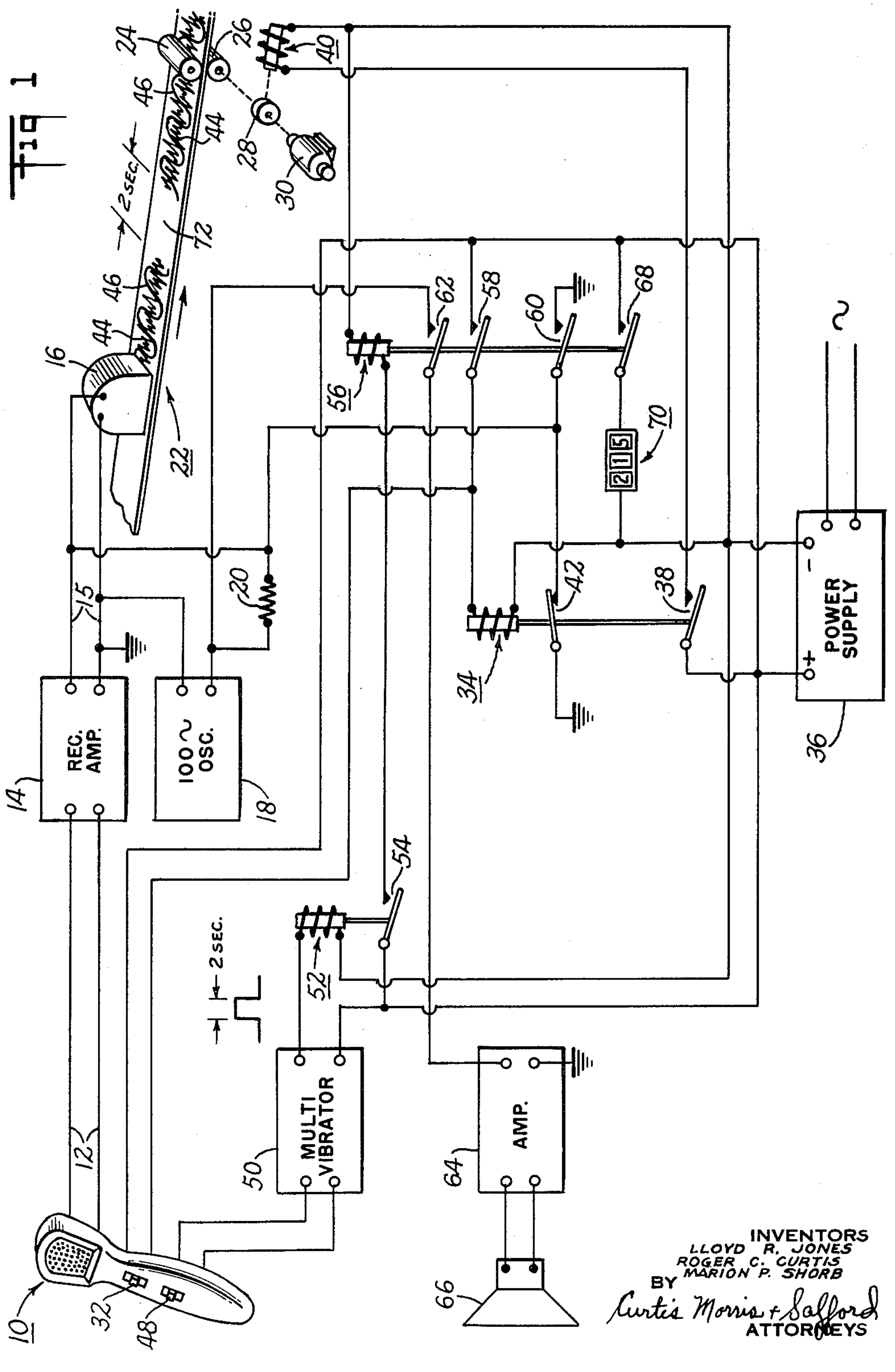

This invention relates to remotely-operable recording-reproducing systems. More in particular, this invention relates to systems that are especially adapted for use in selectively reproducing sequential sections or "blocks" of dictated material such as audible instructions for workers performing repetitive step-by-step operations. The present invention is directed to improvements in systems of the general type disclosed in copending application Serial No. 745,127, filed June 27, 1958, by Marion P. Shorb et al.

In the system disclosed in that copending application, verbal instructions are recorded in sequential blocks on one track of a dual-track magnetic tape, and control pulse signals are recorded on the other tape track at positions corresponding to the beginning and end of each block of instructions. To reproduce the recorded material on the tape, two magnetic pickup heads are used to sense the audio and control signals respectively. As the tape moves past these heads, the audio signals are reproduced as spoken instructions to be heard by the operator, and at the end of a block of instructions the control signal develops an electrical pulse which operates a control mechanism to stop the tape. The operator then will normally restart the machine, which thereupon plays back the next block of instructions, and automatically stops at the end of this next block. If desired, the operator can "backspace" the machine in order to repeat a block of instructions, and the controls are arranged to automatically stop the machine when the control pulse at the beginning of this block is sensed by the pick-up head.

In the system disclosed in the present application, audio and control signals are recorded together on a single track of tape, thereby doubling the available recording time for a given record area. In more detail, the spoken instructions are recorded on the tape in blocks as before, but a continuous 100-cycle tone signal is recorded along with the dictated material. When the block of instructions has been recorded, both the audio signals and the 100-cycle tone signal cease and the tape is advanced a short distance without any signal being applied to it. The next block of instructions is then recorded, again with the continuous 100-cycle tone signal. Thus, the blocks of instructions define sections of uninterrupted sound signals separated by short "silent zones" where no sound signals are recorded.

During playback of the tape, the sound signals are fed through two different channels. In one channel, the sound signals are fed through a 100-cycle filter and the instructions, thus stripped of the tone signal, are reproduced by an ear-piece to be heard by the operator. In the other channel, the sound signals including the 100-cycle tone are fed to a "voice-operated-relay" which is arranged to maintain the tape moving past the reproducing head as long as sound signals are developed by the tape. Since the 100-cycle tone signal is recorded throughout the block of instructions, sound signals will continually be fed to the voice-operated-relay while the block of instructions is passing beneath the pickup head. That is, if there is a gap in the dictated material, such as due to the dictator momentarily pausing during the recording of the instructions, the 100-cycle tone "fills in" the gap so that continuous sound signals will be fed to the voice-operated-relay.

At the end of the block of instructions, the "silent zone" will pass under the magnetic pickup head and thus sound signals no longer will be fed to the voice-operated-relay. A mechanism controlled by this relay is thereupon set into operation to stop the movement of the tape. This same type of mechanism is used, during a backspacing operation, to stop the tape automatically when the "silent zone" at the beginning of the instruction block is reached.

Figure 2:
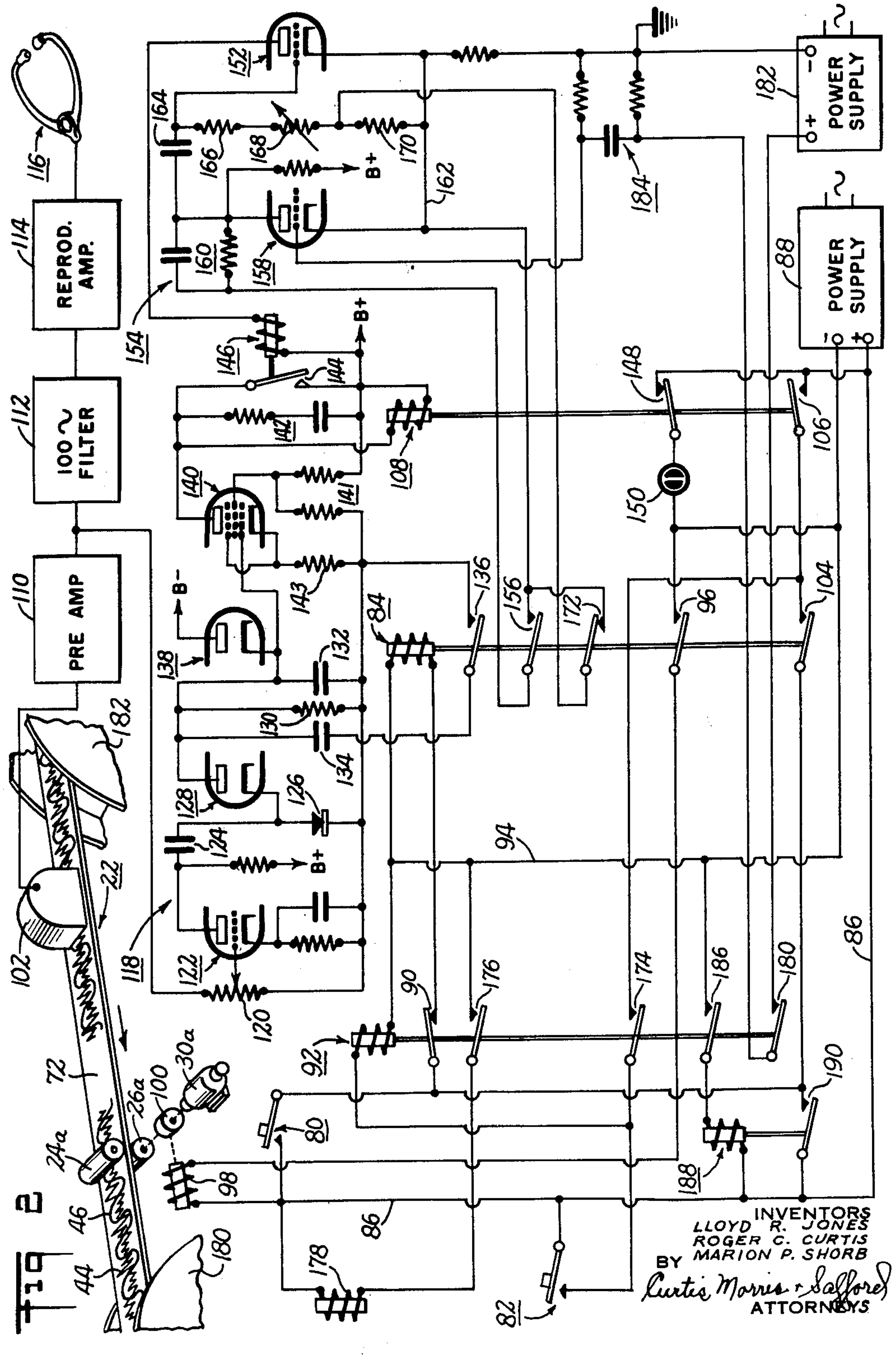

Accordingly, it is an object of this invention to provide a superior recording-reproducing system of the type adapted to reproduce selected blocks of recorded information. It is another object of this invention to provide improved apparatus adapted to record and reproduce spoken instructions in an efficient and economical manner. It is yet another object of this invention to provide improved control devices for such a reproducing system. Other objects, aspects and advantages of the present invention will be in part apparent from, and in part pointed out in, the following description considered together with the accompanying drawings, in which:

FIGURE 1 is a schematic diagram of a recording unit embodying aspects of the present invention; and FIGURE 2 is a schematic diagram of a reproducing unit embodying further aspects of the present invention.

Referring now to the upper left-hand corner of FIGURE 1, the recording unit includes a hand microphone 10 which is connected by a line 12 to the input of a recording amplifier 14. The output of this amplifier is connected through a line 15 to a magnetic recording head 16. Also coupled to this magnetic recording head is the output of an oscillator 18 arranged to produce a continuous tone signal of 100 c.p.s., this signal being fed to the recording head through an isolating resistor 20.

The recording head 16 is in contact with a magnetic record tape 22 which is moved to the right by a pair of drive rollers 24, 26. The lower roller 26 is rotated by means of a clutch 28 driven by a motor 30. The tape 22 normally will be wide enough to provide two side-by-side sound tracks (only one of which is shown in the drawing) and will be wound on rotatable reels, e.g. as in the tape magazine disclosed in copending U.S. application Ser. No. 581,601, filed April 30, 1956, now Patent No. 2,894,700.

To record a block of instructions on the tape 22, the operator first presses a record button 32 on the hand microphone 10 and then dictates the desired instructions into the microphone. This button 32 closes a switch in the hand microphone which completes an energizing circuit for a record relay 34, the current for the relay winding being provided by a D.-C. power supply 36. When the record relay 34 is energized, its contacts 38 close to complete an energizing circuit from the power supply 36 to a clutch solenoid 40 which actuates the clutch 28 and starts the tape 22 moving past the recording head 16. At the same time, another set of contacts 42 of the record relay open to remove a short-circuit ground connection from the upper wire of line 15. Thus the dictated instructions and the 100-cycle tone signal are fed concurrently to the magnetic recording head 16 and placed on the tape. To illustrate this in the drawing, the tape is shown diagrammatically as carrying a voice signal component 44 and a tone signal component 46.

When the operator has completed the recording of one block of instructions, he releases the record button 32 and then presses a stop-zone button 48 also on the hand microphone 10. This latter button closes a switch in the hand microphone which activates a trigger circuit in a "one shot" multivibrator generally indicated at 50. This multivibrator, which may be of usual construction, produces a pulse of output current lasting for two seconds, the current being furnished by the D.-C. power supply 36. This current pulse energizes a stop-zone timer relay 52 so that its contacts 54 close for the two-second period.

Closure of timer relay contacts 54 completes an energizing circuit from the D.-C. power supply 36 to a stop-zone control relay 56 which performs several related functions. One of the sets of contacts 58 of this relay closes to supply current to the record relay 34 which in turn actuates the clutch solenoid 40 to start the tape moving past the recording head 16. Another set of contacts 60 closes and grounds the upper wire of line 15 leading to the recording head so as to prevent any sound signals being recorded on the tape during the two-second pulse period. A third set of contacts 62 completes a circuit from the output of the 100 c.p.s. oscillator 18 to the input of an amplifier 64 which feeds the tone signal to a loudspeaker 66. The sound produced by this loudspeaker serves as a warning to the operator that the system is not conditioned for a recording operation. The last set of control relay contacts 68 closes an energizing circuit from the D.-C. power supply 36 to a counting device 70 which thereupon advances one digit to indicate to the operator the total number of instruction blocks that have been placed upon the tape.

At the end of the two-second pulse produced by the multi-vibrator 50, relays 52 and 56 drop out, the tape stops moving, and the system is returned to standby condition. Thus, when the next block of instructions is impressed upon the tape, it will be separated from the preceding block of instructions by a "silent zone" 72 lasting for two seconds (at the normal operating speed of the tape).

When the tape 22 has been completely filled with the desired sequential blocks of instructions, it is removed from the recording unit and placed in the reproducing unit diagrammatically shown in FIGURE 2. In the reproducing unit, the operator controls the playback of the tape by means of a "listen" switch 80 and a "backspace" switch 82 which normally are foot-operated so that the operator's hands are free to perform the required manufacturing operations.

When the listen switch 80 is closed, it completes an energizing circuit to a playback relay 84. This energizing circuit may be traced through positive power lead 86 of a D.-C. power supply 88, switch 80, contacts 90 of a backspace relay 92, relay 84, and negative power lead 94 of the power supply. When playback relay 84 pulls in, one set of its contacts 96 closes to supply current from the power supply 88 to a clutch solenoid 98 which actuates the clutch 100 and starts the tape moving past the magnetic pickup head 102. A second set of contacts 104 closes to prepare a latching circuit for the playback relay 84. This latching circuit is completed by contacts 106 of a voice-operated-relay 108, and parallels the listen switch 80. Relay 108 is shown in its normal energized condition but, as will be explained, this relay is deenergized when the tape starts to move past the pickup head 102. Thus, if the listen switch is depressed only momentarily, the playback relay 84 will be energized and held in this condition until the voice-operated-relay 108 is reenergized at the end of the block of dictated instructions.

While the tape 22 is moving, the magnetic pickup head 102 senses the sound signals on the tape and feeds corresponding electrical signals to a preamplifier 110. The output of this preamplifier is applied to a 100-cycle filter 112 which eliminates the 100-cycle tone signal (placed on the tape by the recording unit previously described), and the dictated instructions are fed from the output of this filter through a reproducing amplifier 114 to the operator's ear-piece 116. Thus the operator hears the instructions and carries out the described steps.

The output of the preamplifier 110 also is fed to the input of a relay amplifier, generally indicated at 118, which controls the voice-operated-relay 108. In this relay amplifier the audio signals from the tape 22 (including the 100-cycle tone signal) are fed through a potentiometer 120 to the control grid of a triode tube 122 having the usual biasing circuit 123 and load resistor 125. The intensified output of this tube passes through a coupling capacitor 124 to a voltage-doubling circuit, comprising diodes 126 and 128 which produces across an output resistor 130 (1 megohm) a negative D.-C. voltage corresponding in amplitude to the audio signals on the tape. In parallel with this output resistor 130 is a capacitor 132 (.005 mf.) and (during a playback operation) a second capacitor 134 (.5 mf.) which is connected in the circuit through contacts 136 of the playback relay 84. Also connected to the output resistor 130 is a third diode 138 the plate of which is held at a slight negative potential relative to ground, and which serves to prevent the output of the voltage-doubler from going negative more than about 2 volts. Thus when the end of the audio signals from tape 22 is reached, the output potential of the voltage-doubler can quickly return to its normal more positive value.

The output potential on the voltage-doubler resistor 130 is fed to the control grid of a pentode tube 140 the plate of which is connected through the winding of voice-operated-relay 108 to a positive plate supply source (not shown). The screen grid of this tube is supplied with energizing potential through a resistance network 141, and an unbypassed resistor 143 is connected in the cathode circuit to enhance stability. While the reproducing unit is in "standby" condition (i.e. prior to playback of the tape 22), the potential on the control grid of tube 140 is sufficiently positive that the plate current of this tube maintains the voice-operated-relay actuated. However, when sound signals are fed from the tape to the relay amplifier 118, the resulting drop in potential of this control grid causes the current through the relay to decrease to a level where the relay becomes deactuated.

With voice-operated-relay 108 deactuated, its contacts 106 are closed to maintain the energizing circuit for playback relay 92 completed, and thus the tape 22 continues to move past pickup head 102. Since the tape has recorded on it the 100-cycle tone signal 46, voice-operated-relay 108 will remain deactuated until the silent zone 72 at the end of the instruction block is reached even if there are gaps in the dictated material. When the silent zone is reached, relay 108 will be energized and the machine will stop; for that reason, zone 72 also may be referred to as a "stop zone."

Connected in parallel with the winding of relay 108 is an R-C circuit 142 and contacts 144 of a clutch-start relay 146. At the start of a playback operation, relay 146 is deenergized momentarily (as will be described) so that its contacts 144 short out the winding of voice-operated-relay 108. This short circuit assures that relay 108 is deactuated immediately when the tape starts moving, so that its contacts 104 close to complete the latching circuit for the playback relay 84 previously described. Shorting of the relay winding is provided because, when the tape 22 first starts to move, the pickup head 102 normally will be positioned over one of the silent or stop zones 72, and relay 108 would otherwise remain energized until this zone had passes beneath the pickup head.

When the voice-operated-relay 108 is deactuated, its contacts 148 open to interrupt the energizing circuit of an indicator lamp 150. While the reproducing machine is in "standby" condition prior to a playback operation, this lamp glows to indicate that the machine is in the stop zone and prepared for operation; when the tape 22 starts to move the indicator lamp goes out.

When the tape 22 has been driven to the end of the recorded instruction block and the subsequent stop zone 72 begins passing beneath the pickup head 102, the sound signals fed to the relay amplifier 118 will cease and the voice-operated-relay 108 therefore will be reenergized. Thus relay contacts 106 open to interrupt the latching circuit for the playback relay 84, which will then drop out providing listen switch 80 is open (as it normally will be). Consequently, the clutch solenoid 100 is deenergized, the tape stops moving, and the reproducing machine is returned to standby condition in preparation for the next playback operation.

Reverting now to the clutch-start relay 146 mentioned above, it will be seen that this relay is supplied with current through the plate of a triode tube 152 which forms part of a "one-shot" multivibrator generally indicated at 154. While the reproducing unit is in standby condition, this tube 152 conducts heavily, and its plate current is sufficient to maintain relay 146 energized with its contacts 144 open. However, when the listen switch 80 is closed to start a playback operation, playback relay 84 is energized (as described above) and its contacts 156 close to activate a trigger circuit for the multivibrator. In more detail, closure of contacts 156 couples the plate of the other multivibrator tube 158 through an R-C circuit 160 to the common cathode lead 162 of the multivibrator. Consequently, since the potential across the circuit 160 and interstage coupling capacitor 164 cannot change instantaneously, the control grid of tube 152 is driven negative relative to the cathode of this tube, and current through tube 152 immediately stops so that relay 146 is deenergized. Thus contacts 144 of this relay close to short out the voice-operated-relay 108, and contacts 106 of this latter relay close to complete the latching circuit for the playback relay 84.

When the multivibrator tube 152 stops conducting, current flows through the other tube 158 and its plate potential therefore remains relatively low and tends to hold the control grid of tube 152 at a low potential. However, the coupling capacitor 164 between these tubes immediately starts to discharge through grid resistors 166, 168, 170, and after a short period of time the potential of the control grid of tube 152 rises sufficiently to initiate conduction through this latter tube. When this occurs, the multivibrator immediately switches back to its normal condition, with tube 152 conducting and tube 158 cut off. Thus relay 146 is immediately reenergized at the end of the multivibrator pulse to remove the short circuit from relay 108.

The values of the coupling capacitor 164 and the grid resistors 166, 168, 170 are so proportioned that the multivibrator pulse lasts for three seconds. This insures that the tape 22 will have moved beyond the two-second "silent zone" 72 before the relay 146 is reenergized, and thereafter the voice-operated-relay 108 will be held deactuated by the sound signals produced by the tape.

It should be noted that, for reasons to be explained below, grid resistor 170 normally is shorted out by contacts 172 of the playback relay 84. However, energization of this relay during a playback operation opens contacts 172 to remove this short-circuit, so that resistor 170 is operative along with resistors 166 and 168 to determine the multivibrator pulse time.

At times, the operator of the reproducing unit may wish to repeat one or more instruction blocks on the tape 22, and for this purpose the unit is provided with a "fast-backspace" mechanism arranged to stop automatically at the beginning of an instruction block. To backspace the tape one block, the operator merely depresses the backspace switch 82 momentarily to complete an energizing circuit for the backspace relay 92, the relay current flowing through leads 86 and 94 of the power supply 88. When this relay pulls in, its contacts 90 open to break the energizing circuit for playback relay 84 and thereby prevent any inadvertent actuation of this latter relay.

When backspace relay 92 is actuated, its contacts 174 close to prepare a latching circuit for the backspace relay. This latching circuit is completed by contacts 106 of the voice-operated-relay 108 to form a path in parallel with the backspace switch 82. As will be explained below, voice-operated-relay 108 is deenergized upon actuation of the backspace relay, so that its contacts 106 immediately complete this latching circuit. Consequently if backspace switch 82 is released after a momentary closure, the backspace relay nevertheless remains energized until the voice-operated-relay is reenergized.

When backspace relay 92 is actuated, its contacts 176 close to energize a backspace solenoid 178, the solenoid current being furnished by the power supply 88. This solenoid controls conventional backspace drive means (not shown herein) arranged for example to rotate one of the tape reels 180, 182 in reverse direction, and at the same time shift drive roller 26*a* away from the tape. This backspace drive means moves the tape in a reverse direction at a speed approximately 25 times that of normal playback speed.

To assure that voice-operated-relay contacts 106 close at the start of a backspacing operation, contacts 180 of the backspace relay activate a trigger circuit leading to the multivibrator 154. In more detail, relay contacts 180 connect the positive terminal of a D.-C. power supply 182 to a capacitative coupling circuit 184 which thereupon applies a positive trigger pulse to the control grid of the first multivibrator tube 158. This tube starts conducting and, because its plate potential immediately drops, correspondingly drives the control grid of the other tube 152 to cut-off. Thus relay 146 is deenergized and its contacts 144 close to short out the winding of the voice-operated-relay 108. As a result, the voice-operated-relay contacts 106 close to complete the latching circuit, previously described, which holds the backspace relay in.

When the multivibrator 154 is triggered by the backspace relay 92 as described above, there is no concurrent actuation of the playback relay 84, and playback relay contacts 172 remain closed to short out grid resistor 170. With this resistor shorted out, the other multivibrator timing circuit elements (i.e. capacitor 164 and resistors 166, 168) are so proportioned that the multivibrator will pulse for only 0.5 second. This shorter pulse time is provided because, with the tape moving at a speed about 25 times normal playback speed, the stop zone 72 will pass out from beneath the pickup head 102 within 0.5 second. Thus when the short-circuit is removed from the voice-operated-relay at the end of this period, the pickup head will be sensing sound signals on the tape.

While the tape 22 is moving in reverse at high speed, the sound signals sensed by the pickup head 102 are fed as before through the preamplifier 110 to the relay amplifier 118, and also to the filter 112 and reproducing amplifier 114. This latter amplifier, however, normally will be provided with muting switch contacts (not shown), which are operated by the playback 84 to disable amplifier 114 whenever this relay is deenergized. Consequently, the audio signals produced during backspacing will not reach the earpiece 116 to disturb the operator.

The audio signals fed to the relay amplifier 118 are rectified in the voltage-doubler circuit 126, 128 previously described to produce a negative D.-C. voltage at the input of tube 140. The D.-C. voltage fed to tube 140 serves, just as in a playback operation, to deenergize the voice-operated-relay 108 and thereby maintain its contacts 106 closed. Hence the backspacing operation will continue as long as the head 102 is over one of the blocks of dictated instructions on the tape 22. When the end of the block is reached and the next stop zone 72 moves under the head, the cessation of audio signals will cause the voice-operated-relay 108 to be reenergized, and its contacts 106 will open to break the latching circuit for the backspace relay 92. Consequently, this relay will drop out to de-energize the backspace solenoid 178, and thus the tape 22 will stop.

Because the tape is moving at such a relatively high speed during backspacing, the stop zones 72 will be much shorter in time than during a playback operation. Therefore, in order to assure that the voice-operated-relay 108 will drop out before the end of this shortened stop zone, the time constant of the voltage doubler circuit is reduced during backspacing by disconnecting the capacitor 134 from the output of the voltage-doubler circuit.

The reproducing unit also is provided with means for automatically starting a playback operation when the backspacing movement has ended. For this purpose, the backspace relay 92 is provided with a set of contacts 186 which close during backspacing to energize an automatic-review relay 188. When the tape stops moving, this latter relay remains actuated for a short period of time, i.e. this relay is of the "slow-release" type, and its contacts 190 stay closed momentarily after the relay has been de-energized. Consequently, when the backspace relay contacts 90 close at the end of backspacing movement, a momentary energizing circuit is completed to the playback relay 84 through contacts 90 and 190. The playback relay thus is energized and latched in just as though the listen switch 80 had been momentarily closed. For that reason, the reproducing unit follows the same operational sequences described above for a normal playback operation, i.e. the tape 22 will start moving forward at playback speed and the operator will hear in the ear-piece 116 the instructions in the next succeeding block on the tape.

It will be apparent that a backspacing operation can be initiated at any time, although normally it will be initiated when the reproducing unit is in standby condition, i.e. with the head 102 positioned over one of the zones 72. Backspacing movement of the tape 22 will continue as long as the backspace switch 82 is held down, but as soon as this switch is released the tape will stop when the next silent zone 72 reaches the pickup head 102. The tape thereafter will move forward at normal playback speed until it reaches the end of that particular block, at which point it will stop and the machine will return to standby condition.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. Apparatus for controllably reproducing the voice signals on a record carrying sequential blocks of recorded dictation such as spoken instructions for manufacturing operations, said record also carrying a control signal co-extensive with said blocks of dictation with said blocks being separated by stop zones having no signals recorded thereon; said apparatus comprising a reproducing head, playback drive means for producing forward relative movement between said head and said record, backspacing drive means for producing reverse relative movement between said record and said reproducing head, start control means for activating said backspacing drive means, a voice-operated-relay coupled to the output of said reproducing head and responsive to both said control signals and said recorded dictation for maintaining said backspacing drive means activated while said control signal is being sensed by said reproducing head, circuit means controlled by said relay for stopping said drive means when one of said stop zones is reached by said reproducing head, and automatic-review means operable to activate said playback drive means immediately after the reverse record movement has stopped.

2. Apparatus as claimed in claim 1, including interlock means for disabling said voice-operated-relay circuit means for a short period of time after actuation of said start control means.

3. Apparatus for controllably reproducing voice signals in the form of successive messages such as spoken instructions for manufacturing operations consisting of a sequence of coordinated steps, said apparatus comprising a flexible elongated sound record having a sound track on which are recorded the successive messages, said sound record also having recorded on the same track with said messages a series of signal blocks each superimposed on and coextensive with a corresponding one of said messages, each of said signal blocks consisting of a continuous signal serving to fill in any unrecorded segments in said track resulting from speech gaps in the corresponding message, each message with its superimposed signal block being separated from the preceding and succeeding messages with their superimposed signal blocks by a silent unrecorded control zone; a single reproducing head cooperable with said record track for reproducing all of the signals on said record track and for developing a single composite output signal representing the combination of each message and its superimposed signal block, drive means for moving said record forward and backward with respect to said reproducing head, said drive means including means to move said record at normal reproducing speed and also at a speed substantially higher than normal speed, control means operable to activate said drive means to permit reproduction of said messages, and voice-operated relay means responsive to said composite output signal developed by said reproducing head, said relay means including means operable to maintain said drive means activated as long as any output signal is being developed by said reproducing head, said relay means further including means to stop said drive means when the output signal from said reproducing head stops as the next one of said silent unrecorded control zones is reached.

4. Apparatus as claimed in claim 3, wherein said record is a magnetic tape, said continuous signal being a sine-wave signal having a frequency near the lower end of the audible frequency spectrum.

References Cited in the file of this patent

UNITED STATES PATENTS

| | | |
|---|---|---|
| 2,141,203 | Abbott | Dec. 27, 1938 |
| 2,553,410 | Handschin | May 15, 1951 |
| 2,615,989 | Thad | Oct. 28, 1952 |
| 2,780,679 | Vandivere | Feb. 5, 1957 |
| 2,787,669 | Flan | Apr. 2, 1957 |